(12) United States Patent
Rahms et al.

(10) Patent No.: US 10,404,948 B2
(45) Date of Patent: Sep. 3, 2019

(54) LONGWALL FACE SUPPORT IN AN UNDERGROUND MINE

(71) Applicant: TIEFENBACH CONTROL SYSTEMS GMBH, Bochum (DE)

(72) Inventors: Peter Rahms, Billerbeck (DE); Sabine Bittner, Herten (DE)

(73) Assignee: TIEFENBACH CONTROL SYSTEMS GMBH, Bochum (DE)

( * ) Notice: Subject to any disclaimer, the term of this patent is extended or adjusted under 35 U.S.C. 154(b) by 306 days.

(21) Appl. No.: 15/125,818

(22) PCT Filed: Mar. 18, 2015

(86) PCT No.: PCT/DE2015/000125
§ 371 (c)(1),
(2) Date: Sep. 13, 2016

(87) PCT Pub. No.: WO2015/139679
PCT Pub. Date: Sep. 24, 2015

(65) Prior Publication Data
US 2017/0019641 A1    Jan. 19, 2017

(30) Foreign Application Priority Data

Mar. 18, 2014  (DE) .................. 10 2014 003 734
Feb. 28, 2015  (DE) .................. 10 2015 002 606

(51) Int. Cl.
*E21D 23/14* (2006.01)
*H04N 7/18* (2006.01)
(Continued)

(52) U.S. Cl.
CPC ............. *H04N 7/181* (2013.01); *E21C 35/24* (2013.01); *E21D 15/00* (2013.01);
(Continued)

(58) Field of Classification Search
CPC ............ E21D 23/0034; E21D 23/0056; E21D 23/085; E21D 23/12; E21D 23/142;
(Continued)

(56) References Cited

U.S. PATENT DOCUMENTS

| 6,361,119 | B1 | 3/2002 | Kussel | |
| 2012/0319453 | A1* | 12/2012 | Ahler | E21C 35/12 299/33 |

FOREIGN PATENT DOCUMENTS

| DE | 195 46 427 | 8/1996 |
| DE | 100 18 481 | 9/2002 |

(Continued)

OTHER PUBLICATIONS

Einicke, G. et al., *The Application of Wireless LANS in Mine Automation* [online] [retrieved Oct. 13, 2016]. Retrieved from the Internet: <URL: eprints.qut.edu.au/33875/1/33875.pdf>. (Aug. 2002) 10 pages.

(Continued)

*Primary Examiner* — Sunil Singh
(74) *Attorney, Agent, or Firm* — Alston & Bird LLP (57) ABSTRACT

The invention relates to the longwall face support of an underground mine having supports (plates 1-18), which longwall face support comprises camera housings (35) each having two cameras (36), which record a monitoring area of the face having a plurality of plates in the longitudinal direction of the gallery and the most complete registration possible of the cross section of the gallery. The cameras in a monitoring area are assigned to a common power supply unit (48) for the power supply and are equipped with intrinsically safe electronics. The electronics have a radio device for high-frequency data transfer (transmission and reception) together with antenna 39 (W-LAN antenna) for the wire-free connection to the local camera network (Wireless Local Area Network). Each camera and each camera (Continued)

housing is assigned a camera code and an address code, which is added to the identification data. Each radio device is configured such that data marked with an extrinsic camera code and data and signals marked with an extrinsic address code is emitted to be transmitted following reception.

19 Claims, 4 Drawing Sheets

(51) Int. Cl.
    *E21D 23/04*         (2006.01)
    *E21D 23/12*         (2006.01)
    *E21C 35/24*         (2006.01)
    *E21D 15/00*         (2006.01)
    *E21D 23/00*         (2006.01)

(52) U.S. Cl.
    CPC ......... *E21D 23/0004* (2013.01); *E21D 23/04* (2013.01); *E21D 23/12* (2013.01); *E21D 23/148* (2016.01)

(58) Field of Classification Search
    CPC ... E21D 23/144; E21D 23/146; E21D 23/148; E21D 23/18; E21D 23/20; E21D 23/16; E21D 23/14; E21D 23/26
    USPC .................................................. 299/1.05–1.9
    See application file for complete search history.

(56) References Cited

FOREIGN PATENT DOCUMENTS

| | | |
|---|---|---|
| DE | 102008029406 | 12/2009 |
| DE | 102009048154 | 4/2011 |
| WO | WO 2008/138316 | 11/2008 |

OTHER PUBLICATIONS

International Search Report and Written Opinion for corresponding International Application No. PCT/DE2015/000125, dated Jul. 13, 2015.

* cited by examiner

LONGWALL FACE SUPPORT IN AN UNDERGROUND MINE

CROSS-REFERENCE TO RELATED APPLICATIONS

This application is a national stage application filed under 35 U.S.C. 371 of International Application No. PCT/DE2015/000125, filed Mar. 18, 2015, which claims priority from German Patent Application No. 10 2014 003 734.7, filed Mar. 18, 2014, and German Patent Application No. 10 2015 002 606.2, filed Feb. 28, 2015, each of which is incorporated by reference herein in its entirety.

The invention relates to a longwall face support in an underground mine according to the preamble of claim 1. This longwall face support is known from DE 102009048154A1. Here, a camera is attached to the cap of each support frame (shield) instead of an ultrasonic transmitter. It serves as a sensor that measures the distance between the conveyor and the support frame for the purposes of controlling the advancing cylinders. With the help of the longwall control system, which is usually equipped with a central processing unit, the position of the individual sections of the conveyor, as well as the position of the shields and the location and orientation of the complete longwall face support can be determined and controlled. To this end, the measurement results from the individual cameras are transmitted to the longwall control system via data lines, which in turn initiates the activation of the individual hydraulic cylinders of each support frame. The cameras therefore only serve as sensors.

From DE 102008029406, a camera is known, which is housed within an ESEN housing and by means of data transmission can transmit the recorded image data from the camera to an external data processing device, and control information in the reverse direction from the external data processing device to the camera assembly, wherein the means of data transmission consist of at least one fiber optic cable, which can be connected to the external data processing device.

In addition, wireless data transmission/radio transmission from the camera assembly to an external data processing device with a Wi-Fi connection (WLAN=Wireless Local Area Network) is proposed. The camera proposed here is much too heavy for practical operation; the image recognition may be helpful in some places of the underground operation; the data transmission system appears to be a strange addition when considered in relation to the usual means of data transmission between the control station positioned in the gallery or above ground and the individual shields.

The object of the invention is an intrinsically safe camera design which is suitable for underground mining, a specific embodiment of the camera which is suitable for use at all points of the face, a data transmission network, which is not only suitable to connect the cameras in a suitable manner to the control station (outstation, longwall control device) and to the shield control devices, but also expediently integrates into the underground data transmission system via the control bus.

The solution according to claim 1 is characterized by the fact, that the cameras in their housing and in the longwall are arranged so as to gather as complete as possible data on the length and the cross-section of the gallery in front of a certain number of support frames, that intrinsic safety is already assured by the intrinsically safe electronics of the cameras, so that the camera body can be a simple sheet metal housing.

that the local camera network (Wireless Local Area Network) is accessible via the wireless antenna of each camera housing and can redundantly or alternatively take over functions of the network between the longwall control device and the shield control devices via the control bus and vice versa;

that the cameras and camera housings are integrated in series into the camera network in such a way that the camera network can be established in part by cable and in part wirelessly. This allows the hardware expenditure for the camera network to be reduced.

that the camera network due to the particularities of the electronics of each camera housing is particularly fast and much faster than the data network via the control bus.

The development according to claim 2 serves to increase the amount of data which can be transferred.

The development according to claim 3 takes the unpredictability of radio and in particular of wireless communication underground into account by also providing cable transmission in certain areas.

By arranging several power supplies to power the camera housings (claim 4), the effects of an outage are minimized. Claim 5 with the development according to claim 6 allows for clear and error-free data transmission between the longwall control device and each of the camera housings integrated into the control process and their cameras.

The invention in the development according to claim 7 allows for the integration of the camera system into the support operation, which is conducted from the control station in the gallery or above ground. Given that the operator receives the image captured by the cameras of the face precisely from the area in which the mining machine is currently located, he thus receives the necessary information to trigger the required control signals and especially emergency signals. For the purposes of providing such information or control signals, previously staff had to be in situ in order to prevent hazards to materials and/or persons. Claim 8 envisages that exactly such emergency situations can be handled in accordance with the invention thanks to the fact that redundant or alternative, and in any case particularly fast data transfer is possible via the camera network.

In the development according to claim 9, an addition and an advantageous further development proposed in DE 100 18 481 B4 for a device for transmitting rock data from the mining machine via radio to several radio receivers positioned at a mutual distance along the mining operation is implemented. Only the strongest and most digitally complete radio signals are forwarded to the central command station for generating the command signals for extraction. Further integration of the camera network into the data transmission for the support operation is envisaged by this further development, which is particularly appropriate due to the speed of data transmission over the camera network. The data collected by the mining machine on operating state and mining state are only of momentary significance and must therefore be transferred to the mining operation for evaluation and consideration very quickly. The mining machine may have means of data acquisition for detecting the position and/or the operating state and/or the instantaneous flow rate and/or the instantaneous torque and/or the type of rock—and the course of the coal seam and is wirelessly connected by a radio device for high-frequency data transfer (transmission and reception) with an antenna (WLAN antenna) to one of the groups of cameras and the camera network.

An object of the invention is to further automate the mining and support operation thanks to the camera system. According to claim 10, a first step toward achieving this goal is automated hazard detection, thanks to which operator errors are avoided and it is made possible to rapidly intervene in the operation automatically or based on warning signals.

In a further development of this aspect of the invention according to claims 11 and 12, groups of cameras according to the invention are used for recording the actual image of the drive-through cross-section. As a result, with the deployment of relatively few measurement resources, maximum safety and reliability for the passage of the mining machine along the longwall is guaranteed to the extent that unmanned operation is made possible. As required for safe operation, the longwall cross-section is measured and evaluated in front of each support frame; however, the measuring sensor system is limited to the cameras and the camera housings, which are only installed at a distance of several support frames.

In this development, a model of the drive-through cross-section, which allows for the passage of the mining machine is predetermined, for example, as a drive-through or contour model for the longwall cross-section before each support frame, and stored in the memory of the longwall control device. This model is stored either as an area with the respective vertices only, or based on the characteristic elements of the available drive-through cross-section.

To determine the actual cross-section, the cameras are used, which record the actual image of the existing drive-through cross-section which is actually present perpendicular to the direction of travel before each support frame within its range of illumination with a known degree of reduction (zoom factor). These actual images are transferred to the control device and processed therein by means of a program suitable for the purposes of enabling operation.

When comparing actual image data and target image data in accordance with the invention, it is taken into account that a match can only be assumed if the measurement positions and reference points of the dimensions in the model and in reality coincide geometrically. The measuring positions are the positions where sensors are installed. These positions must be identical for the determination of the model and for the measuring of the actual state.

The reference points used for dimensioning are, for example, two points on an image that are to be measured with respect to their distance from each other, with regard to the slope of their connecting line, and with regard to the length of the straight lines around their bounds.

In one embodiment, which uses cameras for measuring and evaluating the longwall cross-section before each support frame (claim 11), a simple comparison of areas is employed. For this purpose, the drive-through model may also be saved in the memory in the form of an image only without individual measurement dimensions having to be stored. The controller fits the stored target image, i.e. the drive-through model/contour model to the cross-sectional image captured by the cameras (actual image) at predetermined points of comparison, so that similar elements and points of the image and the drive-through model/contour model are superimposed if both are identical. The important factor for enabling the operation is that the image fits the contour model with no overshoot, but with regard to the measuring sensor system is limited to the cameras and camera housings on the support frames.

In another embodiment, which uses cameras for measuring and evaluating the longwall cross-section before each support frame (claim 12), an image evaluation of the captured actual image is carried out to determine the parameters, on which the drive-through model/contour model are also based and which are stored in the memory of the control device. For this purpose, the actual values (slope, distance, length) of the selected parameters are read off from the actual image and are fitted to the drive-through model/contour model at the reference points, which are present in the drive-through model/contour model and the actual image, and mark identical elements in the drive-through cross-section. Depending on whether the slope of the connecting line or the measurement position and the respective actual value in the drive-through model/contour model fits, a signal that can be processed to enable the operation is sent to the operating control of the mining machine.

In the embodiment of the invention according to claim 13, the amount of measurement resources deployed is reduced, whilst at the same time the realistic content of the stored drive-through/contour model is increased. This allows stored design data, which is after all constant, to also be used for target/actual comparison.

The object of the invention to reduce the amount of measurement resources deployed at the face, but at the same time to ensure maximum safety and trouble-free operation, can only be achieved by recognizing that there are disturbances which cannot or cannot reliably be detected by image acquisition and geometric measurement or can only be detected with the deployment of a large amount of resources. Therefore, the invention also provides in claim 14 for the acquisition of such disturbances—in this application referred to as conditional values. The further development according to claim 15 is used to ensure the reliability of image recognition and evaluation. This allows in particular that characteristic elements, measurement points and reference points are marked and clearly recognized.

At the same time it is also a beneficial side effect that this allows the cameras to perform person recognition and to do this more cost-effectively and reliably (claim 16).

Incidentally, the invention is based on the fact that person recognition can only be a side effect of the camera system according to this invention, since the reliability of the operating control system requires a reduction in measurement data, whilst for the recognition of persons, redundancy and excess measurement data do not interfere with the reliability of results but rather improves them. This is the reason for the further development according to claim 17.

According to claim 18, infrared light is also used to improve image recognition, especially in the case of the application of specific markers, marker strips, marking paints, preferably by blending it into the normal illumination with white light.

An exemplary embodiment will be described below with reference to the drawing. Shown are in.

Figure 1:
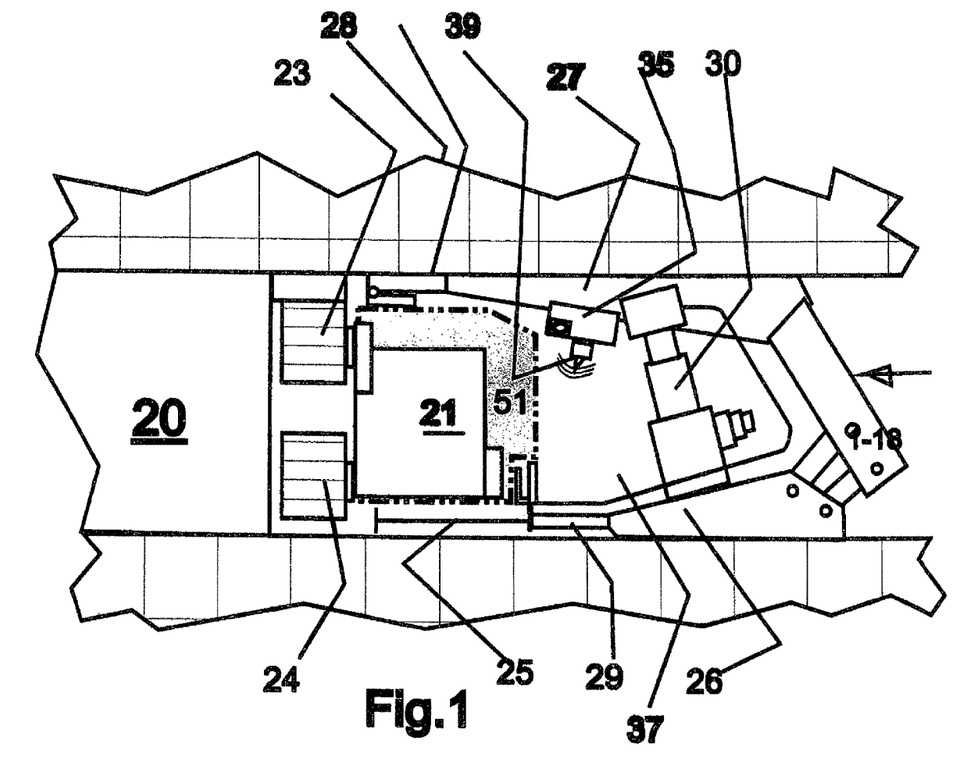
FIG. 1: Sectional view of a longwall with a support shield
Figure 2:
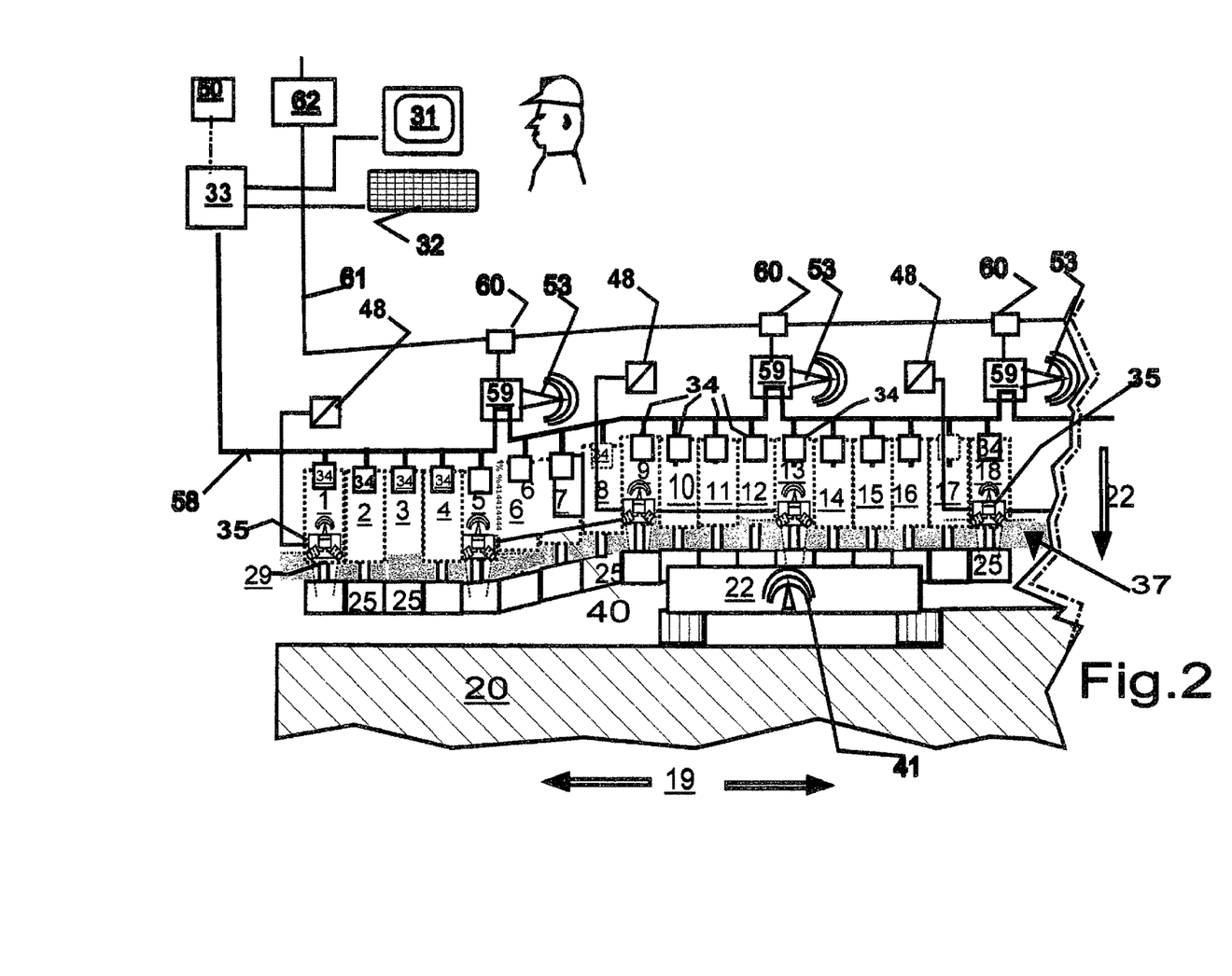
FIG. 2: Schematic view of a coal cutting machine and a group of support shields.

In FIG. 1, the mining machine 21 is shown as a milling machine and one of the longwall support frames 1-18. The support frames are also referred to generally, and in this application, also as support shield or shield. FIG. 2 shows a number of support frames 1 to 18. The support frames are arranged along a coal seam 20. The coal seam 20 is mined in a working direction 22 by cutting devices 23, 24 of a mining extraction machine that, for example, takes the form of a coal cutting machine 21. The coal cutting machine 21 is movable along the coal face in the cutting direction 19 by means of a rope (not shown). The coal that has become dislodged is loaded onto a conveyor by means of the coal cutting machine, also referred to as a "shearer loader". The conveyor consists of a channel 25, in which an armored conveyor is moved along the coal face. The channel is subdivided into individual units which, although interconnected, are capable of performing a movement relative to one another in the working direction 22. Each of the units connects by means of a cylinder-piston unit (advancing piston 29) to one of the longwall support units 1-18.

Each of the longwall support units serves the purpose of supporting the longwall. To this end, further cylinder-piston units, such as 30, are used, which brace a base plate 26 in relation to a roof plate 27. At its front end facing the coal seam, the roof plate is fitted with a so-called coal face catcher 28.

This catcher is a flap that can be lowered in front of the mined coal face. It is necessary to raise the coal face catcher 28 ahead of the approaching coal cutting machine 21. Likewise to this end, a further cylinder-piston unit (not shown) is used.

The coal face catcher 28 may be pivotally mounted on the front of a pusher bar 52. The pusher bar can be retracted and extended by means of a cylinder-piston unit (not shown here) along the plane of the roof plate to extend protection of the roof plate in the direction of the coal face. It is retracted as the mining machine approaches. These functional elements of the individual support frame are shown here only as an example. Other functional elements are present; these include additional power units, in particular hydraulic cylinder-piston units on the one hand, and also sensors (not shown here) to control automatic operation on the other hand. Said cylinder-piston units are operated via valves and electro-hydraulically activated solenoid pilot valves.

In FIG. 2, the coal cutting machine moves to the right. For this reason, the coal face catcher of longwall support frame 17 must be folded back. On the other hand, the unit in the channel 25 (pan) of the longwall support frame 9, which is behind the coal cutting machine—in working direction 19—, advances in the direction toward the mined coal face. Likewise, the following longwall support frames 8, 7, 6, 5, and 4 are in the process of advancing toward the mined coal face. On these support units, the coal face catcher has already been lowered again. The support frames 3, 2, 1 have completed their advance, and remain in their position until the coal cutting machine approaches again from the right.

As a function of the movements of the coal cutting machine and its position at any given time, movements are controlled in part automatically based on a stored program, and in part manually, locally or by remote control.

Longwall support and mining is controlled from the aboveground main control center 50 and/or the underground auxiliary control center 33, also referred to as a control station or longwall control device. The control station is not located in the longwall but in one of the side galleries, from which the longwall is mined out. In the main control center 50 and/or the auxiliary control center 33, the program for automatic operation of the support control and for automatic entry of support commands (extract, advance, setting of support shields) depending on the position of the mining machine. In addition, the retrieval of the measurement values (sensor signals) from the individual sensors by the main control center 50 and/or the auxiliary control center 33 may be programmed. It is also possible to issue commands and retrieve the sensor signals manually from main control center 50 and/or the auxiliary control center 33.

Each longwall support frame is associated with a shield control device 34. Each shield control device 34 is connected to the functional elements of its support shield, and in particular to the sensors and the actuating magnets of the pilot valves and/or main valves of the power transmitters. Details can be found in the cited prior art.

The shield control devices 34 receive their command signals from the longwall control station—in this exemplary embodiment from the underground auxiliary control center 33 in one of the galleries.

The control center is equipped with a screen 31 on which the mining and support process can be visualized for the operator, who can intervene via an input device 32 if necessary and in particular in case of emergency issue emergency signals and/or emergency stop signals.

Signals and commands are transmitted via the multi-core cable 58 (communications bus, control bus). It connects all shield control devices 34 to each other and to the control station 33. The cable is also used to power the support frames, for example, the control solenoids of the hydraulic valves.

Due to the high number of shield control devices 34, the control bus is subdivided with converters 59 at intervals of every few support frames and the power cables are connected here to the power supplies 60. The power supplies are connected to the central power supply via a line 61.

Via each of the shield control devices, the support commands, status data and other data entered at or sent from the control station are received by all the other shield control devices and passed on to all other shield control devices, as well as to the control station.

By means of a predetermined code (shield code word), only one of the shield control devices of shields 1-18 or a group of shield control devices can, however, be activated to perform the requested function, such as a measurement value request or support function e.g. for the purposes of extraction, advancing, or setting. The activated shield control device then converts the received function command, for example a measurement value request or support command, into a command to be sent to the functional elements, sensors, control valves and main valves associated with the support shield concerned.

The activation of the shield control device of a particular support shield and the automatic triggering of functions and functional processes is described for example in DE 195 46 427.3 A1.

It is clear that processes of movement in a longwall are very complex and because of the specific nature of the local situation cannot be supervised and predicted by a single person.

Therefore, the operation of the mining machine is, according to the invention, supported by the use of cameras—with the goal of achieving full automation, which, with the deployment of a low amount of measurement resources, makes it possible to replace or support the human monitoring of mining operations, and in particular allows avoidance of collisions between mining machines and support structures.

Figure 4:
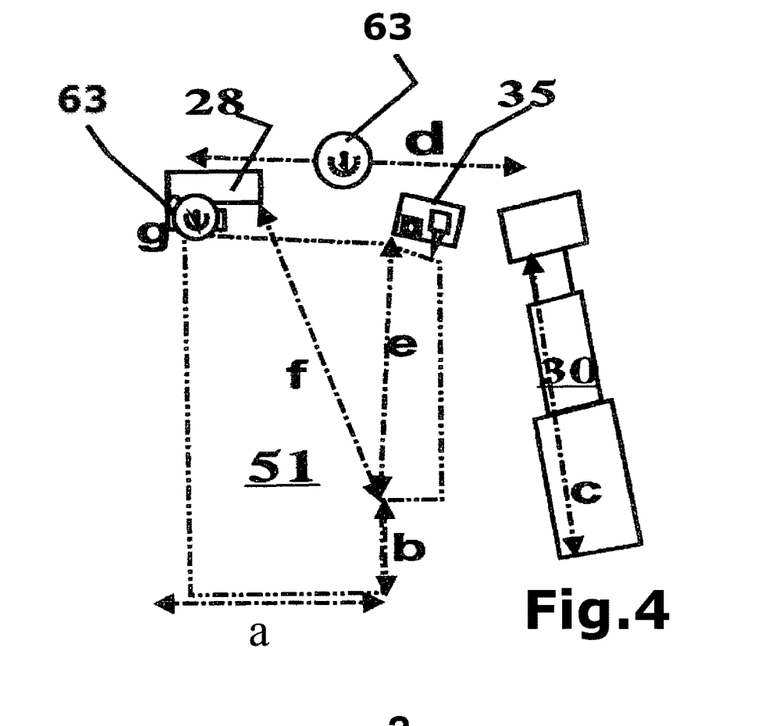
FIG. 4: A drive-through model as contour model

For this purpose, the main control center 50 and/or the longwall control device/auxiliary control center 33 has a storage capacity, in which a model 51 of the required drive-through cross-section is saved for all longwall cross-sections within a distance of one support frame. Such a model 51 is shown in FIG. 1 as an area marked with dot-dashed lines in the actual drive-through cross-section and is shown in FIG. 4 as an area with dimensions, measurement points and reference points for dimensions.

Since the support structure is made up of identical support frames, the drive-through model is generated for the longwall once manually or through test runs with corresponding adjustment made to the mining machine. It is defined as the contour of the surface which is marked here with a dot-dashed outline, and is stored in this form in the memory of the longwall control device. It may, however, also be determined by characteristic structural components of the available drive-through cross-section and their dimensions. Such structural components, their dimensions, the measurement points and reference points for their dimensions are indicated in FIG. 4.

- a is the distance between the reference points of the seam-side lateral edge of the channel and the inner edge of the cable attachment plate on the channel, measured as the extended length of the advancing piston 29 plus the structural width of the channel;
- b is the structural height of the cable attachment plate;
- d is the slope of the roof plate
- c is the extended length of the piston 30, measured by a sensor in the cylinder between appropriate reference points, possibly plus any additional structural measurements;
- e is the distance between the reference points: the top edge of the cable attachment plate and the bottom edge of the camera, measured by a distance sensor on the cable attachment plate;
- f is the distance between the reference points: the top edge of the cable attachment plate and the bottom edge of the pusher bar;
- g is the slope of the flipper bar These parameters form a polygon that, if appropriately reduced in size, taking constant or specific given characteristics of the longwall cross-sections into account, can be used as a drive-through model and be stored with these parameters in the memory of the longwall control device.

For each approach of the mining machine, the actual available drive-through cross-section of each of the support frames, channels, etc. is now determined. The cameras according the invention are used to determine such data.

Figure 3:
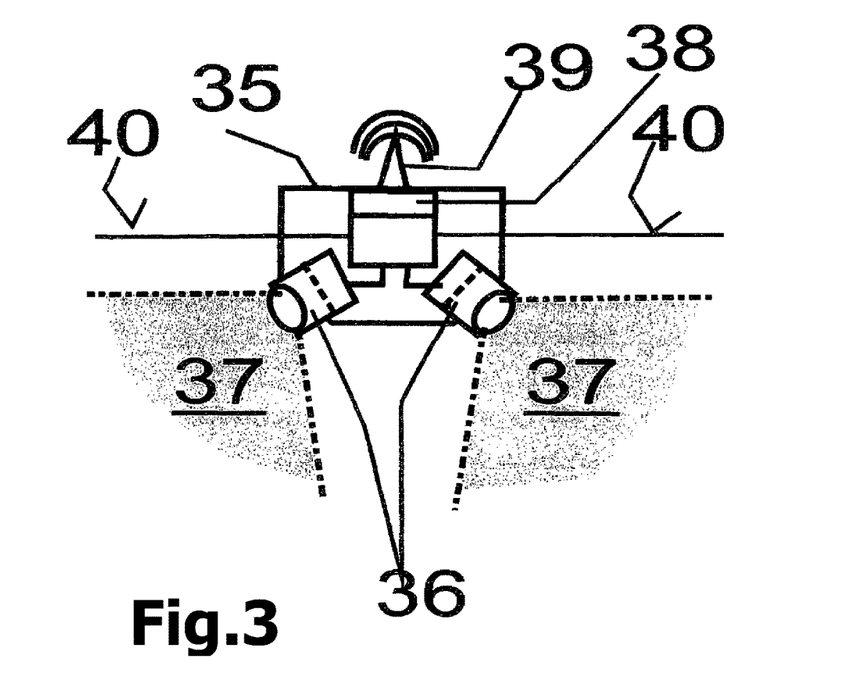
FIG. 3: Schematic diagram of a camera housing

The camera housings 35 with two cameras 36 each are mounted at a distance of several shields apart with opposite detection areas 37 in the longitudinal direction of the longwall on each shield concerned. The camera housings are spaced out at a distance of several shields apart, but are arranged close enough to each other that the fields of view of the longitudinally adjacent cameras overlap in the longitudinal direction in such a way that reliable image evaluation is always possible. The conditions of the mining operation—e.g. height of the longwall, visibility conditions, dust and pollution, as well as the manner in which the camera system is integrated into the operation—for example only to facilitate manual operation, redundancy for manual operation or full automation and in particular the resulting safety requirements are factors in determining the distance between the camera housings. A distance of every 3 to 8 shields apart may be considered.

It should be noted that there is a tendency to attempt to limit the number of cameras, as with a greater number of cameras the probability of failure increases, which then leads to the shutting down of the whole mining operation in the longwall.

The cameras detect, within their detection area 37 transverse to the longwall, the free cross-section of longwall below the roof 27 including the cable attachment plate, the channel and the working area of the cutting machine. Along the length of the longwall, the detection area 37 covers several shields (monitoring area).

Adjacent monitoring area/detection areas 37 can also overlap as a precautionary safety measure.

In this defined detection area, not only is the presence of a person detected but any optically visible irregularity in mining operations—e.g. broken down coal seam wall in the area of movement of the coal cutting machine—and in support operations—e.g. an unretracted coal face catcher 28, unretracted shields—is also detected and transmitted to the control station in the form of an image file or as a warning signal or emergency signal after the image data has been evaluated.

Two cameras are accommodated in each camera housing 36. There is an angle of about 120° between their optical central axes. This angle depends on the field of view of the cameras. This field of view is indicated in FIG. 3 by the reference numeral 37 and shaded in gray. The angle between the central axes of the cameras will be selected so that the fields of view of the cameras capture the passage of the longwall between the coal seam and the channel 25 in the transverse direction completely and in the longitudinal direction over a certain distance (the monitoring area).

Besides the two cameras 36, each camera housing 35 is equipped with the camera electronics 38 with processing capacity, memory and a transmitter/receiver for high-frequency radio signals, as well as a radio antenna 39. Some of the adjacent camera housings may also be connected to each other via data cable 40. These camera housings form a camera island from which data is transferred to the next camera housing and/or to the next camera island via radio link. In this way, some of the camera housings can be provided without radio equipment and antennas. However, it is preferable that all of the camera housings be equipped with radio for reasons that will be discussed later.

To communicate with the mining and support operation, the camera housings are thus integrated by radio and antenna 41 and data cable 40 into a local area network (Wireless Local Area Network).

The camera electronics 38 are configured so that incoming data via radio or data cable, which is not intended for one of the cameras 36 of the respective camera housing, is sent on immediately.

The last camera housing in the longwall is preferably connected to the control station 33 via fiber optic cable 42 (not shown) or electronic cable for data transmission.

Evaluation may in the simplest case be carried out by laying the actual image file over the drive-through model saved as an area at reference points which are present in both images—e.g. at the top of the cable attachment plate.

A warning or emergency signal or release signal is then generated depending on whether the stored drive-through model in the actual image file fits with the reference points without any overshoot.

Otherwise, the evaluation can be carried out by determining whether the characteristic elements described above, the dimensions of which are based on the drive-through model, fit with the available drive-through model. For this purpose, the dimensions of these structural components in the recorded actual image file are measured, taking account of the measurement points and reference points for measurement, and it is determined whether the stored drive-through model fits into the polygon formed by these actual parameters, or if the parameters stored in the memory of the longwall control device match the parameters from the actual image file or deviate from them outside the permitted limits.

Figure 5:
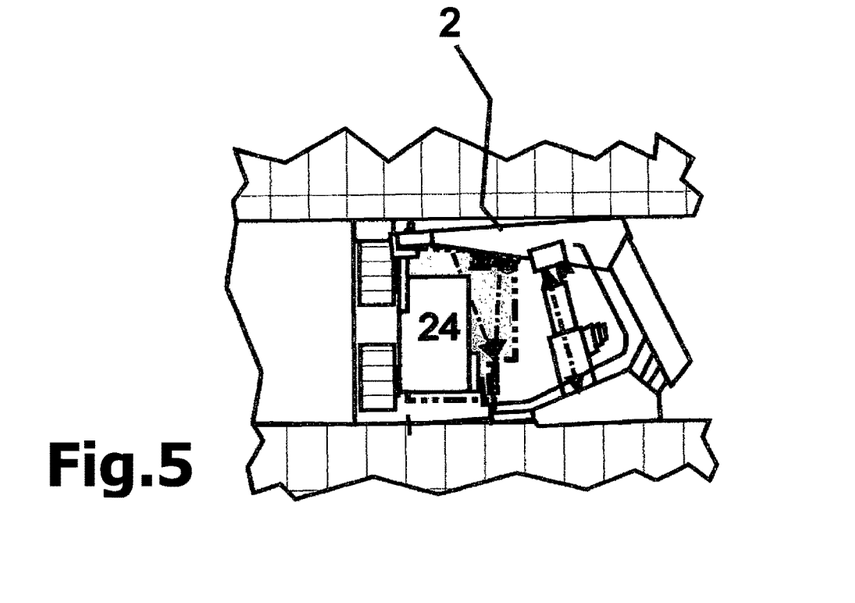
FIG. 5: Sectional view as per FIG. 1, but with lowered support shield

It is known from experience that proper and trouble-free mining and support operations also depend on factors—especially non-geometric factors—that cannot be captured in a geometric model. In this respect, reference is made to claim 2. It is therefore envisaged that a sufficient number of these factors can be monitored simultaneously with the model comparison. FIG. 5, for example, shows a support frame that has become entrenched in soft ground and is tilted at an angle. When measuring and comparing the actual drive-through cross-section and the drive-through model, this error is not detected and can lead to the collision of the mining machine with the support frame. It can be detected and signaled, for example, by measurement of the angle of slope on the skid and/or roof and/or channel.

The processing capacity is used to detect any deviations determined based on the comparison and evaluates them according to prescribed rules and algorithms and/or reports them to the control station 33, where they are displayed on the screen 31 and are evaluated by the operator and used to control the mining and support operation. It is also possible to use the evaluation in the camera housings directly to generate a signal or an emergency signal if they are connected, as interference-free radio transmission is not always guaranteed in the area of the gallery.

Otherwise, radio transmission is also possible. The camera data is thus received at the control station 33 and displayed on the screen 31. The operator can respond as appropriate via the input device 32, if the image data transferred does not appear to be as required or is not useful.

Practical is above all the operation of those cameras and camera housings that are located in the area just before, at and just after the current position of the mining machine. It is preferable that the operation of the cameras outside of this zone be turned off and similarly that the lighting only be switched on when the mining machine is approaching.

Other than that it will be evident that a camera monitoring system with image data evaluation, as envisaged according to the invention, is only possible if the longwall area to be monitored is illuminated appropriately. Though it cannot be shown clearly here, the illumination can be improved on the one hand by marking strips, luminous plates and the like at points to be highlighted, and on the other hand also by the blending in of infrared light.

Not only is the presence of a person detected in the defined detection areas but also any optically visible irregularity in mining operations—e.g. broken down coal seam wall in the area of movement of the coal cutting machine—and in support operations—e.g. an unretracted coal face catcher 28, unretracted shields—and above all the drive-through cross-section in front of every support frame is detected.

This drive-through cross-section is passed on to the control station 33 as an actual image file, where it is stored and evaluated according to predefined rules and algorithms. It is envisaged that the cameras 36 perform a complete image data acquisition. In this case, the image data can be stored in the memories of the camera housings. In addition, the processing capacity is designed in such a way that the currently recorded image data can also be compared with older, for example, the most recent image data.

There are two options for evaluation of the actual image files recorded by the cameras
to recognize or anticipate deviations in, or a hazard or threat of disruption to mining operations or support operations.

According to the invention, the camera network is provided as a redundant and alternative network for data transmission to the communications bus 58. To this end, the converters 59 described above are equipped with a radio device and antenna 53. This makes it possible to transmit data in parallel or as an alternative to data transmission via the communications bus 58 over the camera network or—especially when there are disruptions in sections of the communications bus 58—over the parallel section of the camera-network by means of antennas 39 and/or data cable 40. This is particularly advantageous because data transmission via the communications bus 58 is relatively sluggish due to the necessary conversions, while the relayed data transmission over the camera network is much faster and therefore particularly suitable for emergency signals and emergency stop signals. However, it is also possible, in the case of failure of communications bus 58 to transmit—either wholly or even just partially—the necessary control data for mining support and for the mining machine via the camera network.

It is already known (see above) how to acquire rock data or other data from the mining machine by special sensors on the mining machine and how to store such data using appropriate electronics for operating data acquisition 41 fitted to the mining machine. This data is then transmitted by radio to some of the radio receivers set out at fixed points along the longwall and to the control station; the best or the most digitally complete signal respectively is used for mining operations.

FIG. 2 shows the antenna of these detection devices 41 on the mining support machine 21. The camera network according to this invention with its wireless antennas 39 can now be advantageously used for data transmission of the data emitted from antenna 41. Since preferably all camera housings are equipped with radio, an uninterrupted local radio communication between the mining machine and at least one camera housing is constantly guaranteed.

It is to be noted that data transmission from the control station via the communications bus to the individual support frames with their shield control devices is designed in such a way by means of encryption and coding of data that the addressees and senders of signals and commands can be identified and the data and signals are always assigned to the correct transmitter or receiver.

The additional camera network provided according to the invention not only opens up the possibility of a second data network but also offers multiple data paths between the camera network and the regular data network. In addition, the cameras and camera housings are included in the loop of addressees and senders of data and commands. According to the invention, it is also envisaged that the data traveling over the camera network is encrypted using an appropriate coding that allows for identification and addressing. Furthermore, data which has already been sent once is identified on the camera network, so that it is not sent from the same transmitter a second time. This can, for example, be done by adding to the data, for example image data, not just a signal identifying the location and direction of the image recording but also a time signal.

In a further development of the invention, another set of cameras (not shown) is now installed along the longwall. These cameras are arranged with greater density and greater redundancy and their coverage overlaps because they are to be used for person detection. Their detection range can, however, also be limited within the cross-section of the longwall to the area in which persons are expected to be present. These person detection cameras are assigned a second independent camera network. This creates a further alternative and/or redundancy of data transmission, since it is also envisaged that this camera network can communicate by wire or radio devices with the communications bus 58 or with the first camera network.

NUMERALS 1-18. Support units 1 to 18, support shield, shield
20. Coal seam 20
21. Mining extraction machine Coal cutting machine Milling machine Mining machine 21
22. Working direction 22
23 Cutting device, Cutting drum
24 Cutting device, Cutting drum
25 Conveyor, Channel, Unit, Course 25
26 Base plate, Skid 26
27 Roof plate, Roof 27
28 Coal face catcher 28
29. Cylinder-piston unit, Advance piston, Power transmitter 29
30. Cylinder-piston unit, Power transmitter
31. Screen 31,
32. Input device, Keyboard 32
33. Underground control center, Central control station, Longwall control device, Central mining and support control, Longwall control device 33 Devices for longwall/central control
34. Device controller 34, Shield control device, Support control
35. Camera housing 35
36 Camera 36
37. Detection area
38. Camera electronics
39 Radio antenna, Camera antenna, Wireless antenna, Transponder 39
40 Data cable, Camera data cable
41 Antenna, Mining antenna, Operating data acquisition, Device
42 Fiber optic cable
47 Radio device with antenna
48 Power supply Camera power supply
49 Converter
50. Main control center
51 Drive-through model, Contour model, Area 51
52 Pusher bar
53 Transmitter, Antenna
58 Cable, Communications bus, Signal line 58
59 Converter
60 Power supply 60
61 Line 61
63 Slope gauge, Inclinometer Within the framework of this application, the terms out station, control station, control center, longwall control system, longwall control device are used synonymously to designate the control device for controlling mining and support operations located in one of the galleries or above ground. The terms shield control or shield control devices are subsumed to designate the control devices attached to each support frame, which are networked together via a bus system, in this application referred to as a control bus.

The invention claimed is:

1. A longwall face support for an underground mine with support frames, comprising: shield control devices that are connected with a longwall control device by a control bus with data wires for data transmission and power lines for power supply and the power lines of which are connected with power supplies installed at intervals of distance from each other, and the support frames in a mining sector of a mining machine are arranged close together along a longwall and together with a conveyor form a passage having a drive-through cross-section, into which passage intrinsically safe cameras with electronic light detection attached to the support frames are pointed, wherein the cameras are connected to the longwall control device for data transmission,
wherein the passage comprises a monitoring area along the longwall adjacent several support frames, wherein the intrinsically safe cameras comprise camera groups of two cameras, each with opposite optical alignment in the longitudinal direction of the passage, wherein the camera groups provide as complete as possible detection of the drive-through cross-section of the passage, wherein the camera groups are attached one or more of the support frames in the monitoring area in a camera housing for each camera group,
wherein the two cameras of each camera group are equipped with intrinsically safe electronics, which contain a data processor, data memory, and a radio device for high-frequency data transfer plus a wireless antenna for wireless connection to a wireless local area network,
wherein each camera and camera group is assigned an address code, which is added to the received data for the purposes of identification of the addressed camera,
and wherein the wireless local area network is accessible via the wireless antenna of each camera group and is configured to redundantly or alternatively take over functions of the control bus between the longwall control device and the shield control devices via the control bus and vice versa.

2. The longwall face support according to claim 1, wherein the longwall control device comprises a second radio device for high-frequency data transfer plus a second wireless antenna for wireless connection to the wireless local area network.

3. The longwall face support according to claim 1, wherein the control bus and wireless local area network define a camera network, wherein the camera network, in areas that are prone to radio interference or that are too long or complex for WLAN connections, including between the longwall control device and a nearest camera group or island of several adjacent camera groups, is established by fiber optic conductor or cable.

4. The longwall face support according to claim 1, wherein a plurality of camera groups are configured to receive power from a common power supply unit.

5. The longwall face support according to claim 1, wherein each camera and each camera group is assigned a camera code that is added to the transmitted data to identify each individual camera group, and also for the determination of an optical orientation of transmitted image data.

6. The longwall face support according to claim 5, wherein the intrinsically safe electronics of each camera group are set up so that data and signals marked with a different camera code and with a different address code are broadcast for transmission immediately upon being received.

7. The longwall face support according to claim 1, wherein the longwall control device comprises a display screen for representation of transmitted image data.

8. The longwall face support according to claim 1, wherein emergency signals and emergency stop signals between the shield control devices and the longwall control device are transmitted redundantly or alternatively via the control bus and via the wireless local area network, wherein the longwall control device and the shield control devices comprise have interfaces for data transfer between the control bus and the wireless local area network.

9. The longwall face support according to claim 1, wherein for controlling mining operation of the mining machine and for controlling the support frames and the conveyor, the mining machine has means of data acquisition for at least one of: detecting the position, the operating state, the instantaneous flow rate, the instantaneous torque, the type of rock, or the course of the coal seam, wherein the means of data acquisition is wirelessly connected by a third radio device for high-frequency data transfer with a third wireless antenna to one of the camera groups and the wireless local area network.

10. The longwall face support according to claim 1, wherein for controlling mining operation of the mining machine and for controlling the support frames and the conveyor, the intrinsically safe electronics of the cameras are configured to provide automatic image evaluation, enabling automated hazard detection through the storage of known target image data, the acquisition of current actual image data, the comparison of the target image data and the current actual image data, the detection of differences in images, and the detection and signaling of recognized hazards or hazard-enabling situations.

11. The longwall face support according to claim 10, wherein for the storage of the target image data, representations of the drive-through cross-section is stored in the memory of the longwall control device as a drive-through model or contour model with reference points for dimensions, and for the acquisition of the current actual image data, the cameras repeatedly record, upon each approach of the mining machine, images of the drive-through cross-section perpendicular to the direction of travel with a known predetermined degree of reduction, an actual position of the reference points is measured, the current actual image is transmitted with the actual position of the reference points of the longwall control device, and for the detection of differences in images, the longwall control device performs a surface comparison and matches the drive-through model or the contour model to the actual camera image captured by the camera to the reference points, which are present in both images and mark identical elements of the drive-through cross-section, and provides a signal that is processable for drive enabling to the operating control of the mining machine if the images match each other without overshoot.

12. The longwall face support according to claim 11, wherein dimensions of structural components of the longwall support, including the support frames, a channel, the conveyor, and a cable attachment plate, and the mining machine that determine the drive-through cross-section, including one of the following dimensions: slope, distance, or length, as well the reference points, are determined, stored in the memory of the longwall control device and are used to produce the drive-through model or the contour model of the drive-through section.

13. The longwall face support according to claim 10, wherein for the storage of the target image data, dimensions of selected characteristic elements of the drive-through cross-section, in which the mining machine requires unimpeded drive-through for cutting drums, are acquired as selected target parameters of the drive-through model with one of the following dimensions: slope, distance, or length, and are stored in the memory of the longwall control device, and for the detection of the current actual image data, the cameras repeatedly record upon each approach of the mining machine the images of the drive-through cross-section actually present perpendicular to the direction of travel with a known predetermined degree of reduction, the current actual image data is transmitted to the longwall control device, and for detection and signaling of recognized hazard or release situations, the longwall control device is configured to recognize identical characteristic elements to the selected characteristic elements in each of the images of the drive-through cross-section transferred and measures actual values of actual parameters corresponding to the selected target parameters in terms of slope, distance, or length to determine the current actual image data, the longwall control device is configured to provide a signal that is processable for drive enabling to the operating control of the mining machine dependent on whether and how the current actual image data of the actual parameters matches with or deviates from the target image data of the selected target parameters of the drive-through model.

14. The longwall face support according to claim 13, wherein dimensions of structural components of the longwall support, including the support frames, a channel, the conveyor, and a cable attachment plate, and the mining machine that determine the drive-through cross-section, including one of the following dimensions: slope, distance, or length, as well reference points for dimensions, are determined, stored in the memory of the longwall control device, and are used with one or more other parameters for producing the drive-through model or the contour model of the drive-through section.

15. The longwall face support according to claim 10, wherein at least three of the following conditional values:
pressure in the pit props for determining whether the support is set and firmly clamped by means of pressure sensors in the pit props;
pressure and/or stroke of the advance cylinder for determining the distance between the conveyor and the support by means of pressure sensors and/or stroke sensors at the advancing cylinders;
position of the pusher bar relative to the roof by means of a pressure sensor or distance measuring device in the pusher bar;
position/tilt position of the flipper bar by means of an inclinometer;
slope of the roof in the direction of the coal face by means of an inclinometer;
slope of the conveyor perpendicular to the direction of conveying by means of inclinometers in the channels or the conveyor pan; or
slope of the base plate/skid in the direction of the coal face by means of an inclinometer;
are determined by measuring devices installed in measurement positions upon determination of a target cross-section of the required drive-through cross-section and stored in the memory as target values, as well as being determined repeatedly upon the determination of an actual cross-section and are compared as actual values of the conditional values with the target values, and wherein the control device only provides a signal that is processable for drive enabling to the operating control of the mining machine if the difference resulting from the comparison of the target values and the actual values remains within predetermined limits.

16. The longwall face support according to claim 1, wherein characteristic elements defining the drive-through cross-section in the passage, which serve as image points and/or reference points, are made distinguishable by attaching markings, luminous plates, luminous strips, or color markings.

17. The longwall face support according to claim 1, wherein for the purposes of detection of persons, reflective strips are affixed to prominent components of the support frames and the camera groups detecting any disturbance of the image of the reflective strips is configured to be signaled as a hazard.

18. The longwall face support according to claim 17, wherein for the purposes of illumination of the drive-through cross-sections infrared light is also used and it is detected through image processing whether any disturbance of a captured image of reflective strips is caused by persons.

19. The longwall face support according to claim 1, wherein for the purposes of detection of persons, cameras of a second camera system are installed between pit props at regular intervals at a distance of two support frames away, and wherein the second camera system comprises a private network and private addressing range.

* * * * *